(12) United States Patent
Littledeer (10) Patent No.: US 7,674,159 B1
(45) Date of Patent: Mar. 9, 2010

(54) BOARD FOR OPENING AN OYSTER

(76) Inventor: Tomislav F. Littledeer, 1961, Gertrude, Carignan, Quebec (CA) J3L 4G8

( * ) Notice: Subject to any disclaimer, the term of this patent is extended or adjusted under 35 U.S.C. 154(b) by 0 days.

(21) Appl. No.: 12/318,139

(22) Filed: Dec. 22, 2008

(51) Int. Cl.
*A22C 29/04* (2006.01)
(52) U.S. Cl. .................................................. 452/13
(58) Field of Classification Search ................ 452/1–20
See application file for complete search history.

(56) References Cited

U.S. PATENT DOCUMENTS

| | | | |
|---|---|---|---|
| 2,612,653 A * | 10/1952 | Labat | ........................ 452/13 |
| 4,059,870 A | 11/1977 | Finkelman | |
| 5,599,228 A | 2/1997 | Thibault | |
| 2007/0042695 A1 * | 2/2007 | Chong et al. | ................... 452/16 |

\* cited by examiner

*Primary Examiner*—Thomas Price
(74) *Attorney, Agent, or Firm*—Equinox Protection; Franz Bonsang, Patent Agent (57) ABSTRACT

A board for opening an oyster has a cradle consisting of a support wall and a cradle portion sloping upwardly therefrom. The outer wall supports and anchors first end portions of the oyster which rest in abutment against, while the second end portions are disposed and elevated slightly on the cradle portion for opening of the oyster at the second end portions.

13 Claims, 7 Drawing Sheets

BOARD FOR OPENING AN OYSTER

FIELD OF THE INVENTION

The present invention relates to a board for opening an oyster.

BACKGROUND OF THE INVENTION

It is well known in the art to use boards for opening oysters. As is well known, the edible portion of an oyster is situated, and normally enclosed, within an oyster shell consisting of two shell parts, or halves, conjoined to one another along respective contiguous and conjoining edges. Thus, to consume the edible portion, the shell must be opened or otherwise separated from the edible portion. For example, the shell may broken or shattered, as well as cut or separated with a knife, at a point other than the contiguous edges. Use of cutting boards, bowls, plates, and the like for such operations is well known, as the boards, plates, etc. allow for capture of the portions of the shell and the juice of the oyster, as well as the edible part. However, such methods for disengaging the edible portion disadvantageously increase risk that portions of the shell will be mixed with the edible portion.

Preferably, and again as is well known in the art, the shell is opened by at least partially separating the two shell parts along the conjoining edges, typically by cutting in between the conjoined edges with a sharp object, such as a knife, and then prying the two parts away from each other with a lever, which may also be a knife. Such an approach reduces risk that portions of the shell will mix with the edible portion. Further, such an approach allows for consumption of the edible portion, including the juice, from one of the shell parts. Once again, use of conventional cutting boards or other flat surfaces for seating the oyster thereupon while the shell parts are separated along the conjoined edges is well known in the art. Unfortunately, such flat surfaces will not permit capture of juice or other liquid from the oyster. While one could circumvent this disadvantage by using a conventional bowl, plate, or other kitchen container for opening the oyster, opening the oyster by prying apart the two shelf parts while seating the oyster on the surface of such containers is often awkward as the presence of a raised rim of the container relative the surface makes manipulating the lever awkward. Further, as an upward pressure is exerted on one the shell parts, there is a risk that the shell, and possibly part of the edible portion and juice, may be flipped away and out of the container should excessive force be applied.

Accordingly, there is a need for an improved board for opening an oyster.

SUMMARY OF THE INVENTION

It is therefore a general object of the present invention to provide an improved board for opening an oyster.

An advantage of the present invention is that the board allows for capture of juice, liquid, bits of shell, and the edible portion when opening the oyster.

Another advantage of the present invention is that the board facilitates anchoring of the oyster during opening thereof.

A further advantage of the present invention is that the board provides a comfortable angle for prying the two shell halves of the oyster apart.

Still another advantage of the present invention is that the board reduces risk of slippage of the oyster shell during opening.

According to an aspect of the present invention, there is provided a board for opening an oyster thereupon, the board comprising:

a base having a generally flat lower surface and an upper surface disposed generally opposite the lower surface;

a support protrusion having respective first and second side ends extending upwardly from the upper surface and a support wall sloping gradually upwardly from the upper surface between the side ends; and a cradle portion defined by an outer wall sloping gradually upwardly from the upper surface proximal the first and second side ends and away from the support wall, the outer wall tapering inwardly relative to the first and the second side ends to form a respective rounded end disposed generally opposite the support wall, the outer wall defining thereby peripheral first and second cradle sides between which the cradle portion extends, the cradle portion extending across the support wall in intersection therewith and extending from the intersection gradually upwardly to the rounded end to form a cradle with the support wall for seating the oyster with a first end portion of the oyster abuttingly braced against the support wall while a generally opposed second end portion of the oyster is disposed proximal the rounded end and elevated relative the first end portion by the cradle portion for facilitating opening of the oyster at the second end portion.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE PREFERRED EMBODIMENTS

With reference to the annexed drawings the preferred embodiments of the present invention will be herein described for indicative purpose and by no means as of limitation.

Figure 1:
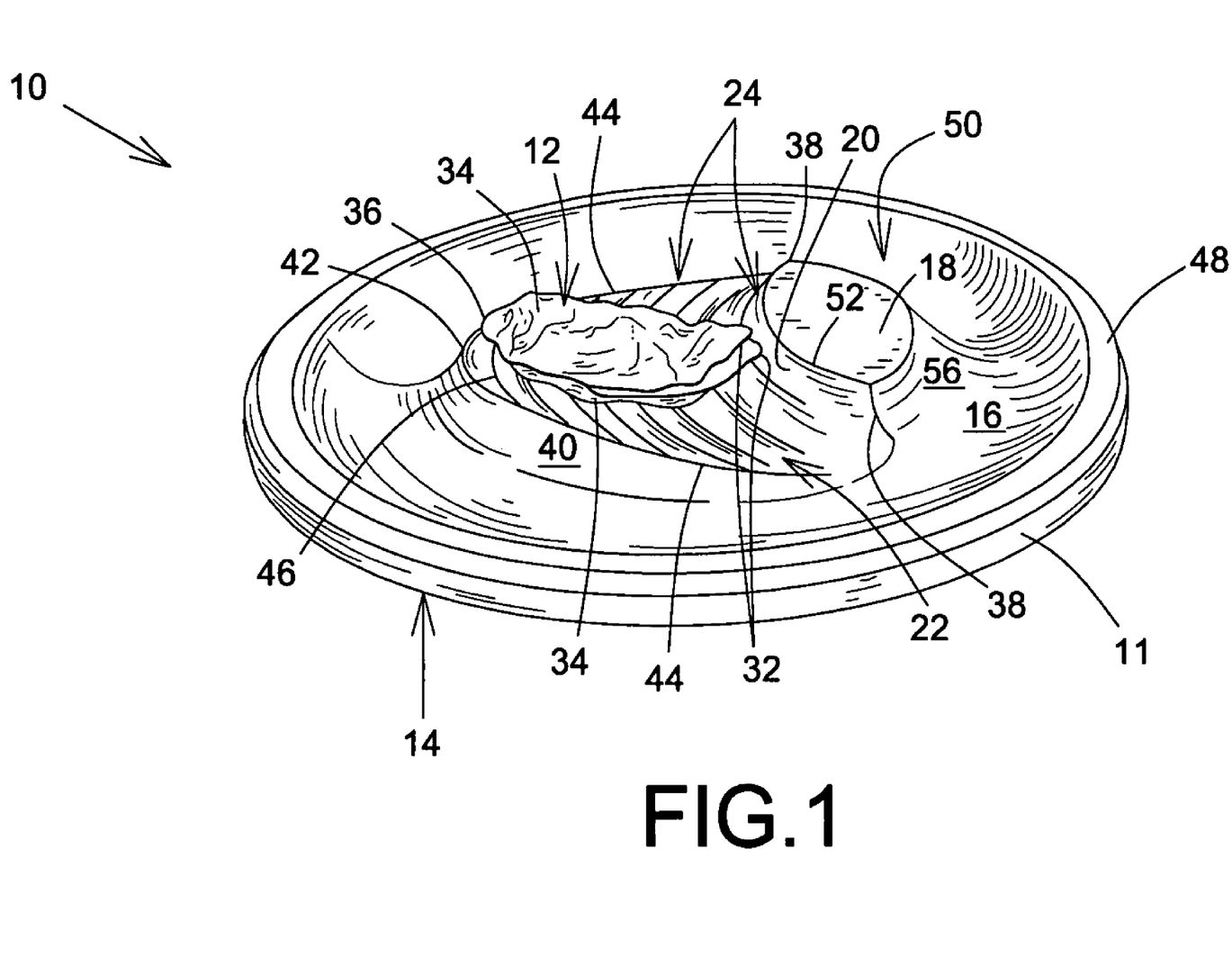
FIG. 1 is a top perspective view of an embodiment of a board for opening an oyster in accordance with a first embodiment of the present invention.
Figure 2:
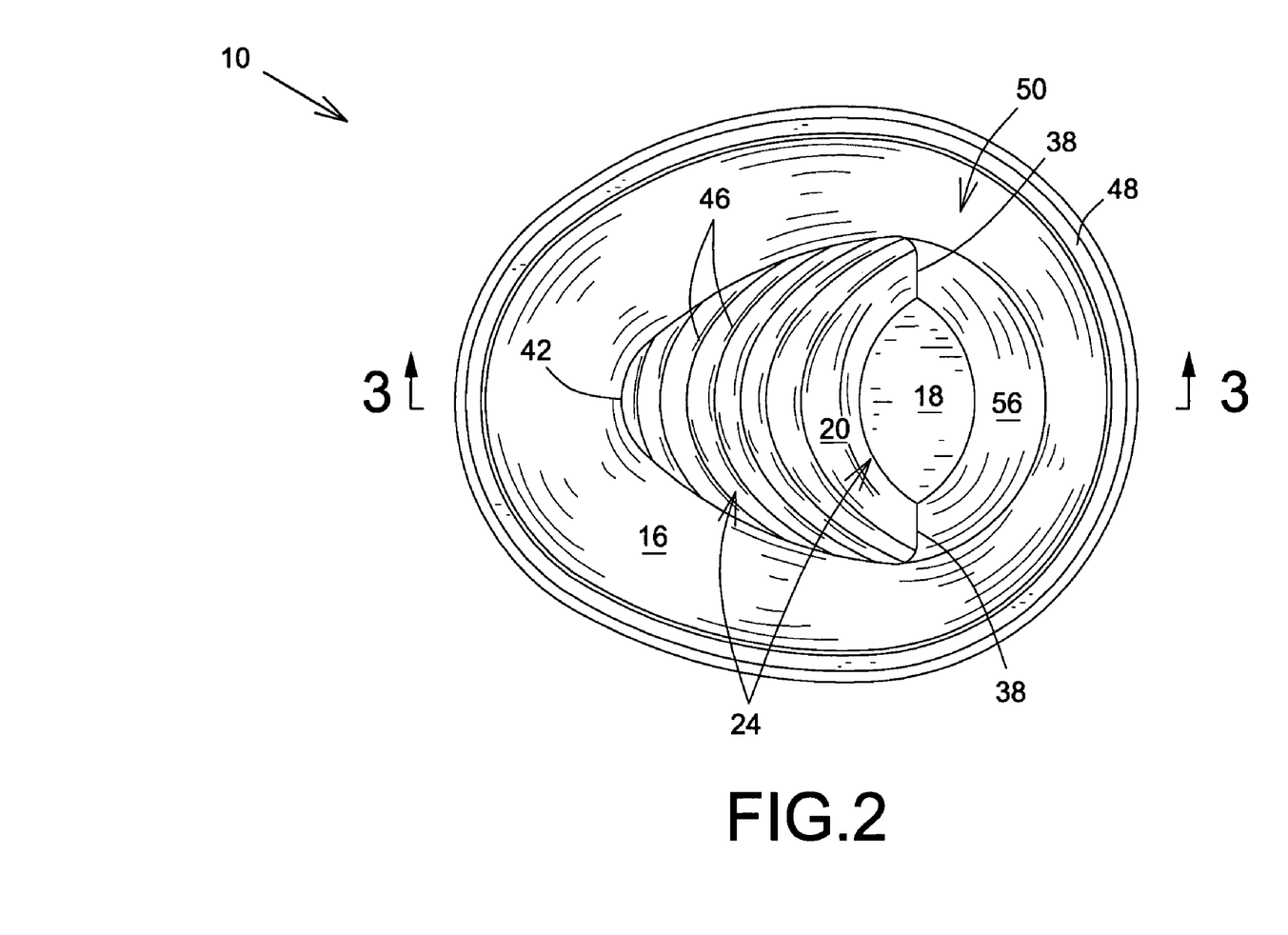
FIG. 2 is a top plan view of the board shown in FIG. 1.
Figure 3:
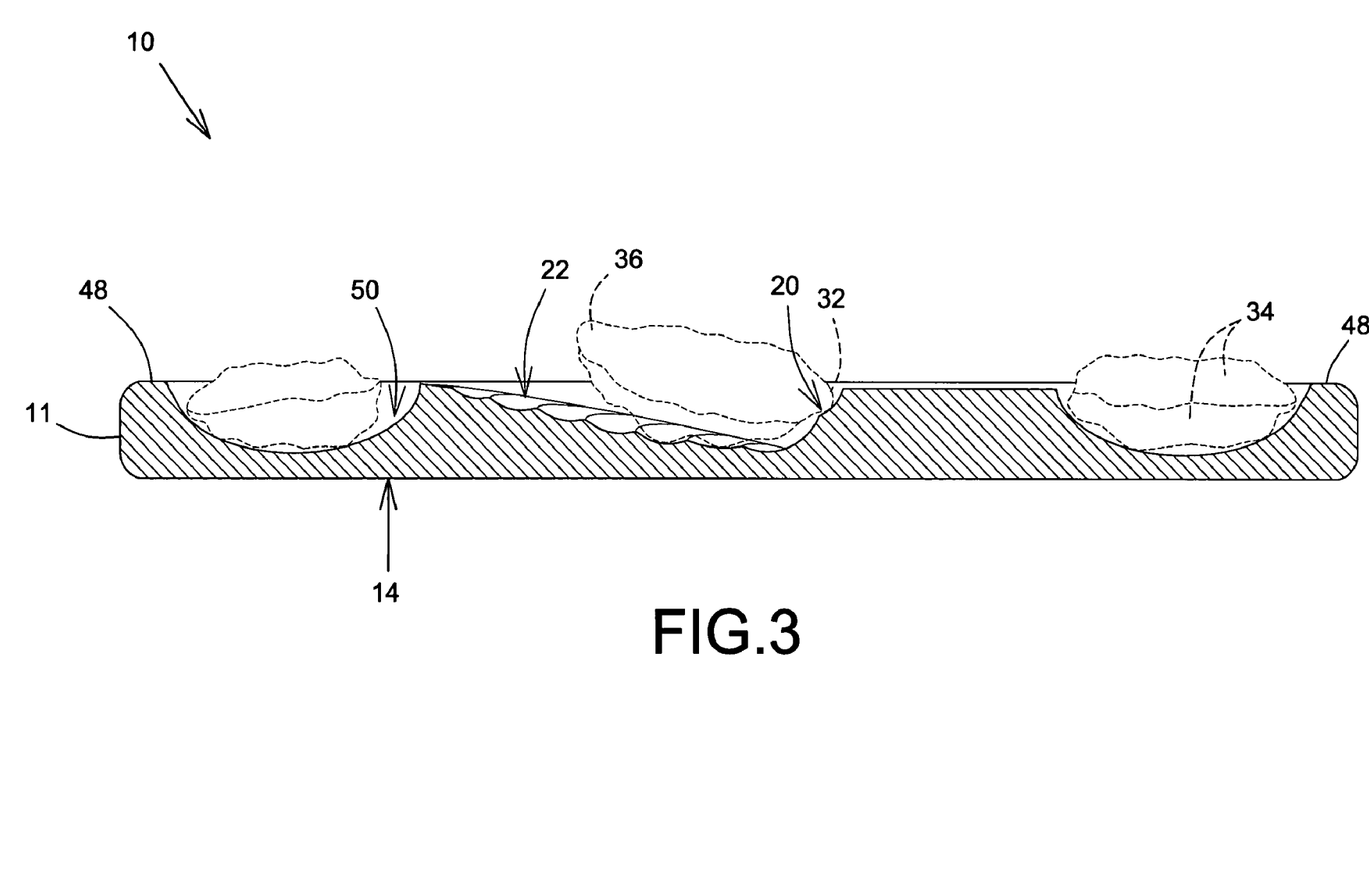
FIG. 3 is a sectional view of the board shown in FIG. 1, taken along line 3-3 of FIG. 2.

Referring to now to FIGS. 1, 2, and 3, there is shown a board, shown generally as 10 and preferably oval in shape, for opening an oyster, shown generally as 12. Generally speaking, the board 10 has a base 11 having a generally flat lower surface 14, generally placed on a support surface such as a counter or the like, not shown, and an upper surface 16 disposed generally opposite the lower surface 14. The upper surface 16 has a support protrusion 18 having a support wall 20, and a cradle portion, shown generally as 22, which intersects the support wall 20 and slopes upwardly therefrom to form a cradle 24 therewith. The cradle 24, extending outwardly and upwardly from the upper surface 16, serves to cradle or seat the oyster 12, with first end portions 32 of the oyster shell halves 32 abuttingly braced against the support wall 20, while leaving the opposed second end portions 36, generally narrower than the first end portions 32, freely exposed and seated on the cradle portion 20. Thus, the opening tool, not shown, 30 can be used to cut and separate the second end portions 36 while the first end portion 32 abuts the support 12, thus partially immobilizing the oyster 12 during opening thereof with an opening tool, not shown. Accordingly, risk of flipping or deflection of any portions of the oyster 12 during opening is minimized.

Turning now in more detail to the cradle 24, the support wall 20 curves convexly outwardly between respective first and second side ends 38 thereof and slopes upwardly from the upper surface 16 between the side ends 38 to an upper free edge 52. The support wall 20 extends outwardly from the upper free edge 52 to an intersection with the cradle portion 22. The cradle portion 22 is defined by an outer wall 40 sloping upwardly from the upper surface 16 proximal the first and second side ends 38 and tapers inwardly therefrom to a rounded end 42 which curves in the same direction as the support wall 20. The outer wall 40, also preferably curved, thus defines first and second cradle sides 44 between which the cradle portion 22 extends. The cradle portion 22 further extends across the support wall 20 in intersection therewith and extends from the intersection upwardly to form the cradle 24 with the support wall 20. The cradle seats the oyster 12 with the first end portion 32 of one half 34 thereof abutting the support wall 20 while the generally opposed second end portions 36 are disposed proximal the rounded end 42 and elevated relative said first end portion 32 for facilitating opening of the oyster 12 at the second end portion 36. Thus, the cradle 24, cradle portion 22, and support wall 20 are sized and shaped to approximate the contour of the oyster 12, and notably half 34 of the shell thereof. Thus, the cradle 24 is sized and shaped for cradling the oyster 12 with the first end portion 32 abutting the support wall 20 and the remainder of the oyster 12 abuttingly resting on the cradle portion 22 with the second end portions 36 of the oyster 12 slightly elevated to facilitate opening thereof with the opening tool. Advantageously, as the second end portion 36 is elevated relative the base 11 and the remainder of the oyster 12, use of the oyster opening tool to open the oyster 12 is relatively unimpeded.

To further provide traction during opening of the oyster 12, the board 10 has a plurality of spaced apart ridges 46 extending outwardly the cradle portion 22 from the first cradle side 44 to the second cradle side 44. The ridges are, preferably, curved between the first and said second cradle sides 44 in the direction of the rounded end 42. Optionally, but preferably, the upper surface 16 is recessed from an outer board edge 48 which defines the outer perimeter for the board 10. The upper surface 16 thus defines a reservoir, shown generally as 50, which extends for the support protrusion 18 and the outer wall 40 to the outer board edge 48. Advantageously, the reservoir 44 provides a space for run off, such as juice from the oyster, when the oyster 12 is opened, as well as parts of the shell.

Figure 4:
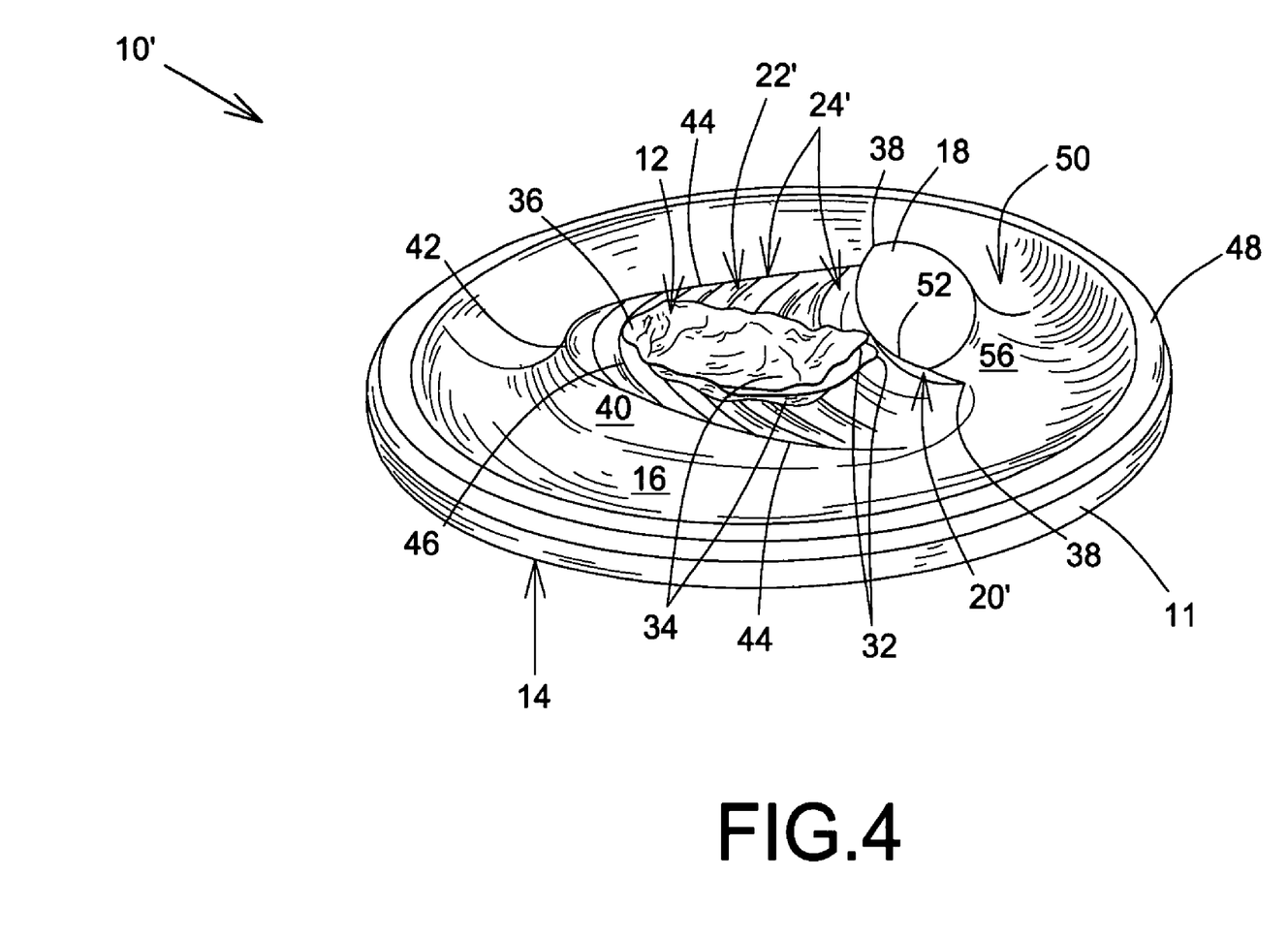
FIG. 4 is a top perspective view of an embodiment of a board for opening an oyster in accordance with a second embodiment of the present invention.
Figure 5:
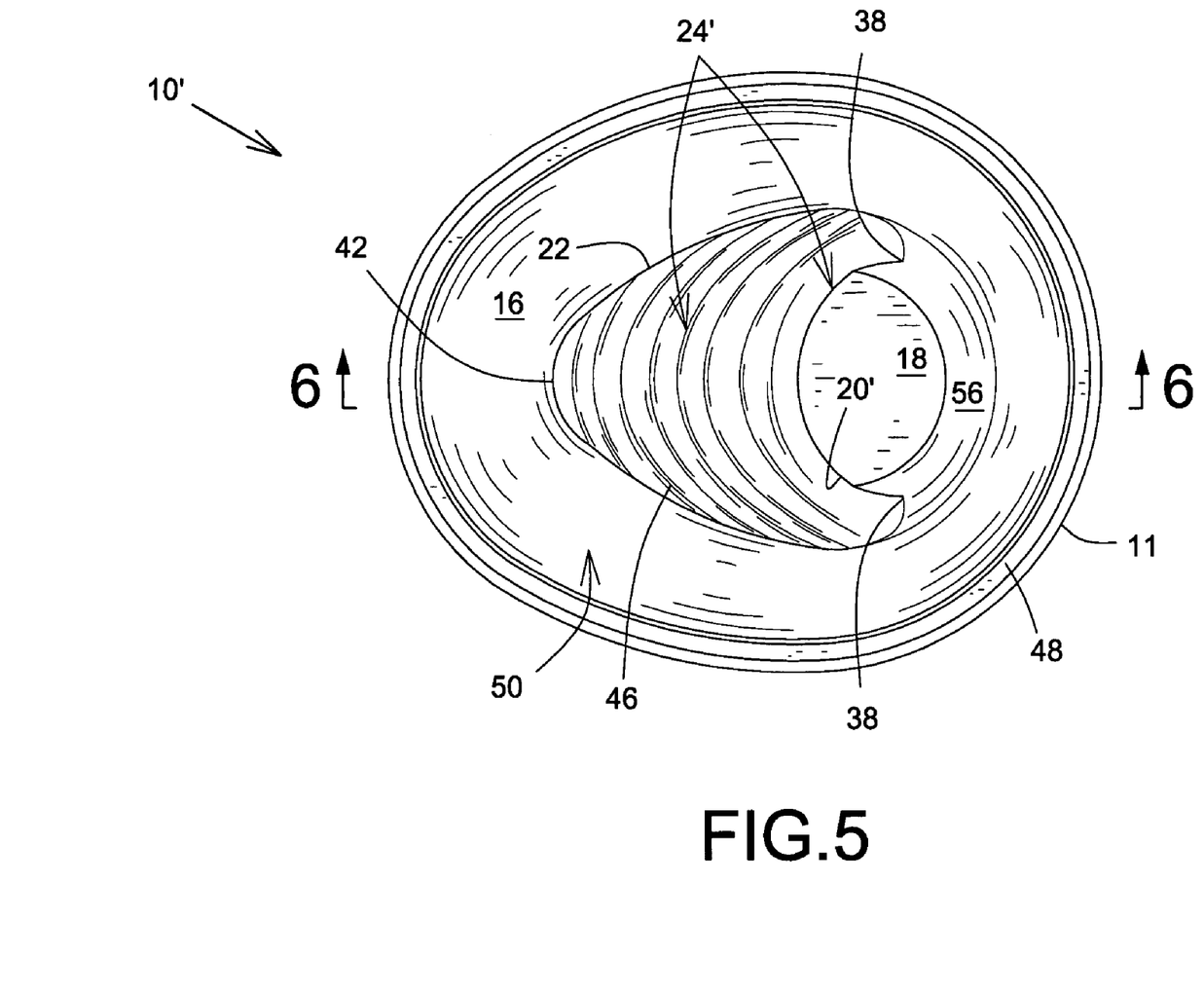
FIG. 5 is a is a top plan view of the board shown in FIG. 4.
Figure 6:
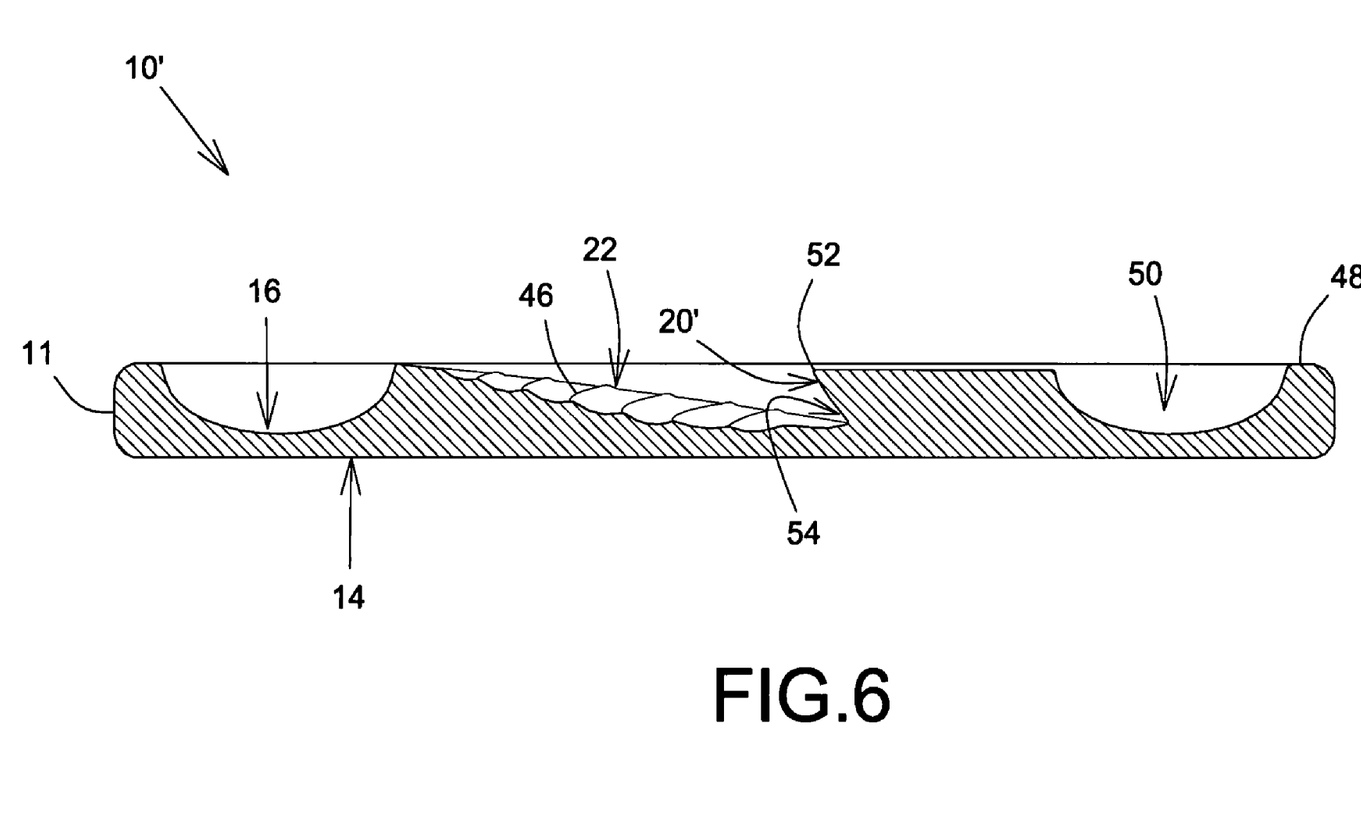
FIG. 6 is a sectional view of the board shown in FIG. 4, taken along line 6-6 of FIG. 5.

Referring now to FIGS. 4, 5, and 6, there is shown a second embodiment of the board 10'. The board 10' is identical in all respects to the board 10 shown in FIGS. 1, 2, and 3, with the exception of support wall 20' and cradle portion 22' for cradle 24'. For the board 10' shown in FIGS. 4, 5, and 6, the support wall 20 tapers inwardly from the upper free edge 52 to the intersection 45 with the cradle portion 22'. Thus, the support wall 20 forms a recess, shown generally as 54, for anchoring the first end portions 32 while the oysters is opened at the second end portions 36.

Figure 7:
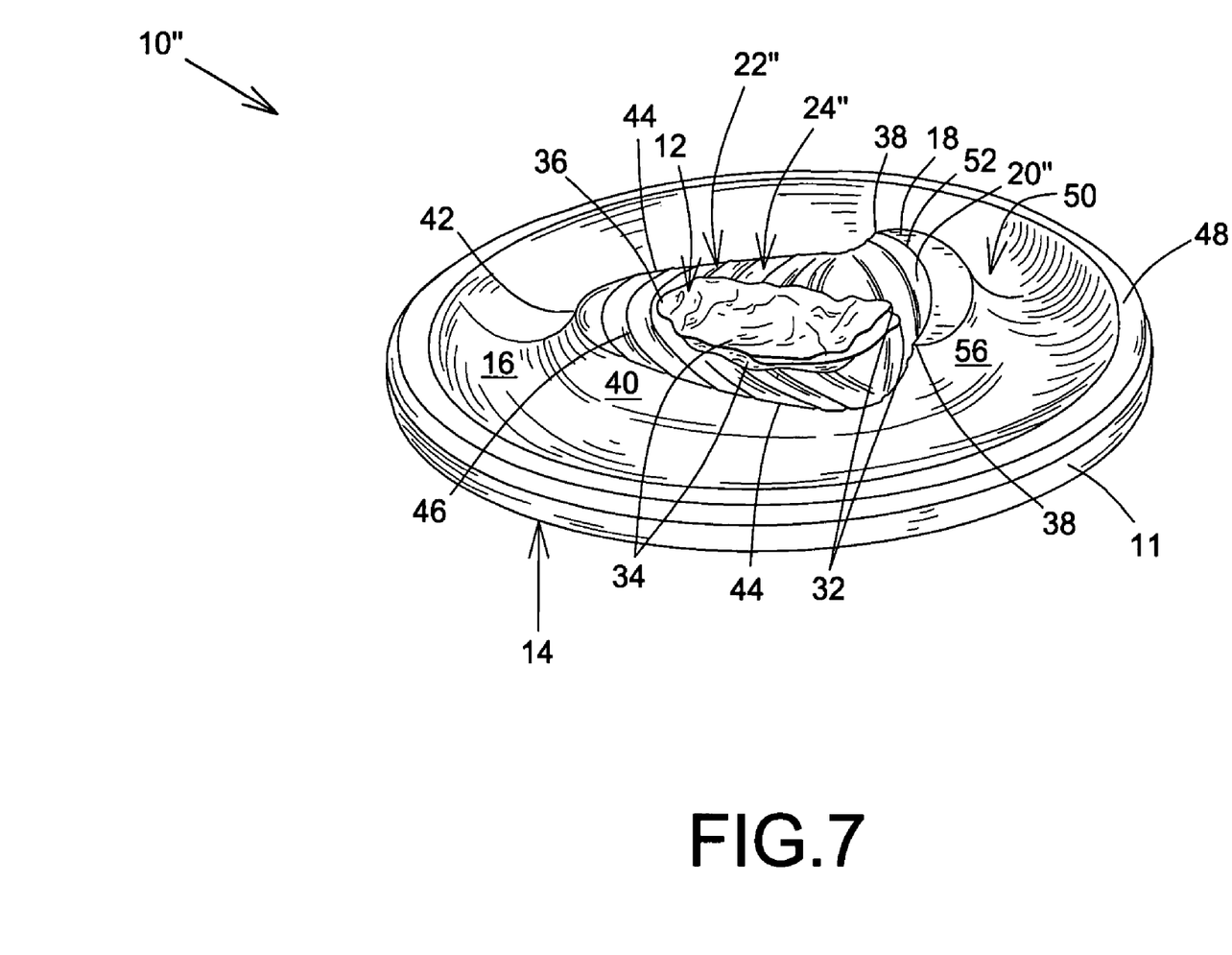
FIG. 7 is a perspective view of an embodiment of a board for opening an oyster in accordance with a third embodiment of the present invention.

Referring now to FIG. 7, there is shown a third embodiment of the board 10". The board 10" is identical in all respects to the board 10 shown in FIGS. 1, 2, and 3, with the exception of support wall 20" and cradle portion 22" for cradle 24". For the board 10" shown in FIG. 7, the support wall 20" curves concavely inwardly between the side ends 38. While the support wall 20, 20', 20" for all embodiments shown is curved, if desired, the support wall 20, 20', 20" could also extend straight between the side ends 38, i.e. along a straight line between the side ends 38.

The board 10, 10', 10" is preferably made of wood, but may also be constructed of other materials, for example, plastic, metal or the like. Further, while the board 10, 10' is preferably oval in shape, the board may be of any shape provided the cradle 24 is disposed on the upper surface 16. Optionally, but preferably, the protrusion 18 also has a rear wall 56, also extending convexly outwardly away, relative the support wall 20, from the side ends 38.

While specific embodiments have been described, those skilled in the art will recognize many alterations that could be made within the spirit of the invention, which is defined solely according to the following claims.

I claim:

1. A board for opening an oyster thereupon, said board comprising:
    a base having a generally flat lower surface and an upper surface disposed generally opposite said lower surface;
    a support protrusion having respective first and second side ends extending upwardly from said upper surface and a support wall sloping gradually upwardly from said upper surface between said side ends; and
    a cradle portion defined by an outer wall sloping gradually upwardly from said upper surface proximal the first and second side ends and away from the support wall, the outer wall tapering inwardly relative to the first and the second side ends to form a respective rounded end disposed generally opposite the support wall, said outer wall defining thereby peripheral first and second sides between which said cradle portion extends, said cradle portion extending across said support wall in intersection therewith and extending from said intersection gradually upwardly to said rounded end to form a cradle with said support wall for seating the oyster with a first end portion of the oyster abuttingly braced against the support wall while a generally opposed second end portion of the oyster is disposed proximal the rounded end and elevated relative said first end portion by said cradle portion for facilitating opening of the oyster at said second end portion.

2. The board of claim 1, wherein said support wall has an upper free edge said support wall extending from said free edge to said intersection.

3. The board of claim 2, wherein said support wall extends outwardly from said upper free edge to said intersection.

4. The board of claim 2, wherein said support wall tapers inwardly from said upper free edge to said intersection to form a recess for anchoring said first end portion.

5. The board of claim 1, further comprising a plurality of spaced apart ridges extending outwardly across said cradle portion from said first side to said second side.

6. The board of claim 5, wherein said ridges curve between said first side and said second side.

7. The board of claim 6, wherein said ridges curved outwardly towards said rounded end.

8. The board of claim 1, wherein said outer wall is also curved along said first side and said second side.

9. The board of claim 1, wherein said board is generally oval in shape.

10. The board of claim 1, wherein said upper surface is recessed from an outer board edge defining a perimeter for said board, said upper surface defining with said outer board edge a reservoir extending from the support protrusion and the outer wall to said outer board edge.

11. The board of claim 10, wherein said upper surface slopes downwardly from said outer board edge.

12. The board of claim 1, wherein said support wall curved convexly outwardly between said respective first and second side ends.

13. The board of claim 1, wherein said support wall curves concavely between said respective first and second side walls.

* * * * *